United States Patent [19]

Haeder et al.

[11] Patent Number: 4,881,371
[45] Date of Patent: Nov. 21, 1989

[54] AUXILIARY COUPLER PRESSURE RELIEF HYDRAULIC SYSTEM WITH PUMP DRIVE IGNITION SWITCH RELIEF

[75] Inventors: Thomas Q. Haeder, Lisbon; William C. Shelbourn, Bismarck, both of N. Dak.

[73] Assignee: Clark Equipment Company, South Bend, Ind.

[21] Appl. No.: 224,165

[22] Filed: Jul. 26, 1988

[51] Int. Cl.⁴ .................. F15B 13/043; F15B 21/08; F04B 49/02; F04B 49/06
[52] U.S. Cl. ........................ 60/431; 60/433; 60/911; 91/464; 180/53.4; 123/179 A
[58] Field of Search ............. 60/427, 431, 433, 493, 60/911; 91/459, 464; 123/179 A, 179 B; 180/14.3, 53.4

[56] References Cited

U.S. PATENT DOCUMENTS

| | | | |
|---|---|---|---|
| 3,369,360 | 2/1968 | de Biasi | 60/19 |
| 3,562,542 | 2/1971 | Redmond | 123/179.4 X |
| 3,612,202 | 10/1971 | Moon | 180/14.3 |
| 3,808,926 | 6/1974 | Wohlwend | 60/427 X |
| 3,864,913 | 2/1975 | Herrmann | 60/433 |
| 4,141,382 | 2/1979 | Miller et al. | 91/464 X |
| 4,314,502 | 2/1982 | Brinkel et al. | 91/464 X |

FOREIGN PATENT DOCUMENTS 2306351 10/1976 France .................... 91/459

*Primary Examiner*—Robert E. Garrett
*Assistant Examiner*—George Kapsalas
*Attorney, Agent, or Firm*—Kinney & Lange

[57] ABSTRACT

An auxiliary coupler pressure relief hydraulic system for off-road vehicles including a battery, an engine, an engine ignition system, a reservoir of hydraulic fluid, and a pump for providing hydraulic fluid under pressure. Quick couplers couple hydraulic fluid to an attachment mounted to the vehicle. An electro-hydraulic spool valve is connected to a source of pilot pressure and controls the flow of hydraulic fluid to the quick couplers in response to valve actuating signals. Forward and reverse auxiliary control switches are coupled to the spool valve and provide valve actuating signals resulting in fluid flow to the quick couplers in forward and reverse directions. Also included is an ignition switch having RUN, OFF and RELIEF positions. When switched from its RUN position to its RELIEF position, the ignition switch provides pressure relief valve actuating signals which stroke the spool valve and bleed pressure trapped between the valve and the quick couplers while the engine RPM is decreasing and pilot pressure is still available.

5 Claims, 2 Drawing Sheets

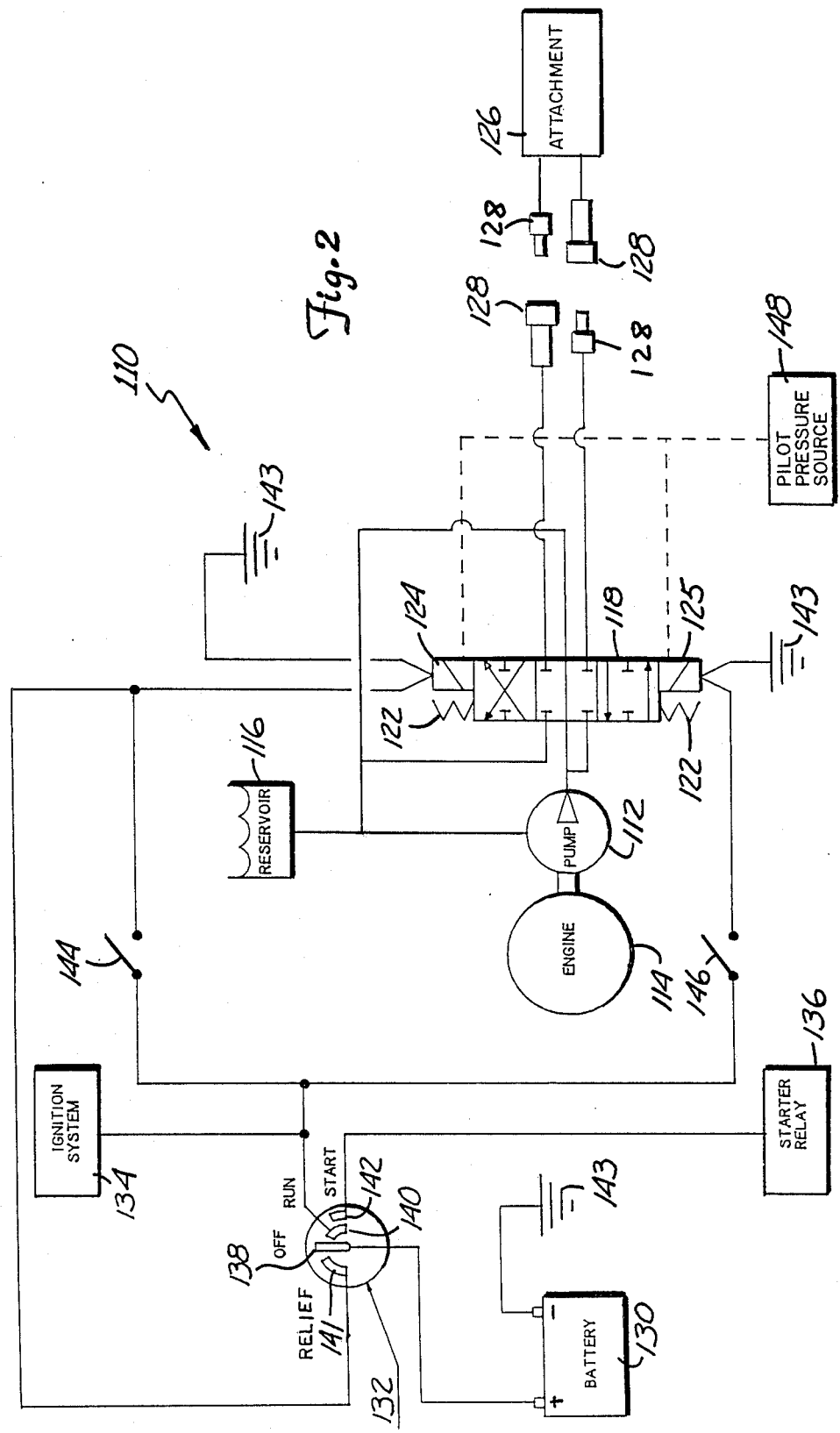

AUXILIARY COUPLER PRESSURE RELIEF HYDRAULIC SYSTEM WITH PUMP DRIVE IGNITION SWITCH RELIEF

BACKGROUND OF THE INVENTION

1. Field of the Invention.

The present invention relates generally to auxiliary or attachment hydraulic systems for mobile equipment. In particular, the present invention is a pressure relief hydraulic system for couplers which interconnect the hydraulic motor of the attachment to the vehicle's auxiliary hydraulic system.

2. Description of the Prior Art.

Mobile, off-road vehicles such as skid steer loaders are often equipped with auxiliaries or attachments which include a hydraulic motor. These attachments are supplied with hydraulic fluid by the vehicles auxiliary hydraulic system. A known prior art auxiliary hydraulic system 10, which can be embodied as a portion of an overall skid steer loader hydraulic system, is illustrated generally in FIG. 1.

Hydraulic system 10 includes a hydraulic pump 12 which is driven by engine 14. Hydraulic fluid from reservoir 16 is pressurized by pump 12 and provided to electro-hydraulic spool valve 18 through load check valve 20. Check valve 20 can be integral with valve 18. Valve 18 is an electro-hydraulically actuated open center valve which includes solenoid valves 24 and 25 and a spool (not separately shown) biased to its neutral position by springs 22. Attachment 26, which can be an auger, trencher, angle boom or other hydraulically powered implement, is coupled to valve 18 of hydraulic system 10 by mated sets of quick couplers 28.

An electrical system associated with hydraulic system 10 includes battery 30, ignition switch 32, ignition system 34, and a starter relay 36. Ignition switch 32 has a rotating contact 38, run contact 40, and start contact 42. A negative (−) terminal of battery 30 is connected to ground 43, while a positive (+) terminal is connected to rotating contact 38. Run contact 40 is coupled to ignition system 34, to ground 43 through auxiliary forward switch 44 and solenoid valve 24, and to ground 43 through auxiliary reverse switch 46 and solenoid valve 25. Hydraulic fluid pilot pressure source 48 is also coupled to solenoid valves 24 and 25. Pilot pressure sources such as 48 are well known and can include a separate charge pump or a return fluid flow from valve 18. Pressure in conduit 50 is maintained by relief valve 49, which allows return flow from valve 18 to be used as a pilot pressure source.

When rotated to its START position, ignition switch contact 38 will be interconnected to contacts 40 and 42. Battery 30 is thereby connected to both ignition system 34 and starter relay 36. Once engine 14 is started, contact 38 is rotated to its RUN position to continue current flow to ignition system 34. With switch contact 38 in its RUN position, and engine 14 running, an operator can use valve 18 to control the flow of hydraulic fluid provided to attachment 26. When forward switch 44 is actuated and closed, solenoid valve 24 will be energized and drive the valve spool from its neutral position against the force of spring 22, as pilot pressure from source 48 is introduced to fully stroke the spool, causing hydraulic fluid from pump 12 to be supplied to attachment 26 in a first or forward direction. The spool will return to its neutral position, thereby discontinuing fluid flow to attachment 26, when switch 44 is opened.

In a similar manner, hydraulic fluid is provided to attachment 26 in a second or reverse direction when reverse switch 46 is actuated. Check valve 20 is included to prevent any backwards fluid flow from attachment 26 which might otherwise be caused by the force of gravity acting on attachment 26 as the spool the stroked position. Valve 18 is schematically shown in FIG. 1 to include transitional spool timing which occurs as the spool is moved from the neutral position to the fully stroked position.

A common problem with auxiliary hydraulic systems such as 10 is that pressurized hydraulic fluid can be trapped in the conduits between couplers 28 and valve 18 after ignition switch 32 is switched to its OFF position. This trapped hydraulic fluid pressure can make it impossible to use couplers 28 to interconnect attachment 26 unless expensive connect-under-pressure type couplers are used. Since engine 14 has stopped, no pilot pressure is available to actuate valve 18 and relieve the trapped pressure. Although the inability to move the valve spool after engine 14 has stopped is not a problem with valve spools which are actuated manually or purely electrically, this deficiency is inherent in state-of-the-art electro-hydraulic spool valves.

It is evident that there is a continuing need for improved auxiliary hydraulic systems. In particular, an auxiliary hydraulic system which includes an electro-hydraulic spool valve and does not require the use of connect-under-pressure couplers is desired.

SUMMARY OF THE INVENTION

The present invention is an auxiliary coupler pressure relief hydraulic system for off-road vehicles. The system can be used with electrohydraulic spool valves, and does not require connect-under-pressure couplers to facilitate the interconnection of an attachment to the spool valve. The hydraulic system includes a battery, an engine, an engine ignition system, and an operator actuated ignition switch having RUN and OFF positions. A pump coupled to the engine and a reservoir of hydraulic fluid provides hydraulic fluid under pressure. Coupler means couple the hydraulic fluid from the pump to an attachment mounted to the vehicle. An electro-hydraulically actuated spool valve is coupled between the pump and coupler means, and controls the flow of hydraulic fluid to the coupler means in response to valve actuating signals. Accessory control switch means coupled to the spool valve provide accessory control valve actuating signals in response to operator actuation. Operator actuated pressure relief switch means capable of providing pressure relief valve actuating signals to the spool valve after the ignition switch has been switched to its OFF position and while the engine RPM is decreasing is also included. The operator can use the pressure relief switch means to relieve hydraulic fluid pressure trapped between the spool valve and coupler means during engine shutdown.

BRIEF DESCRIPTION OF THE DRAWINGS

FIG. 2 is a block diagram representation of an auxiliary hydraulic system for off-road vehicles in accordance with the present invention.

DETAILED DESCRIPTION OF THE PREFERRED EMBODIMENTS

Figure 1:
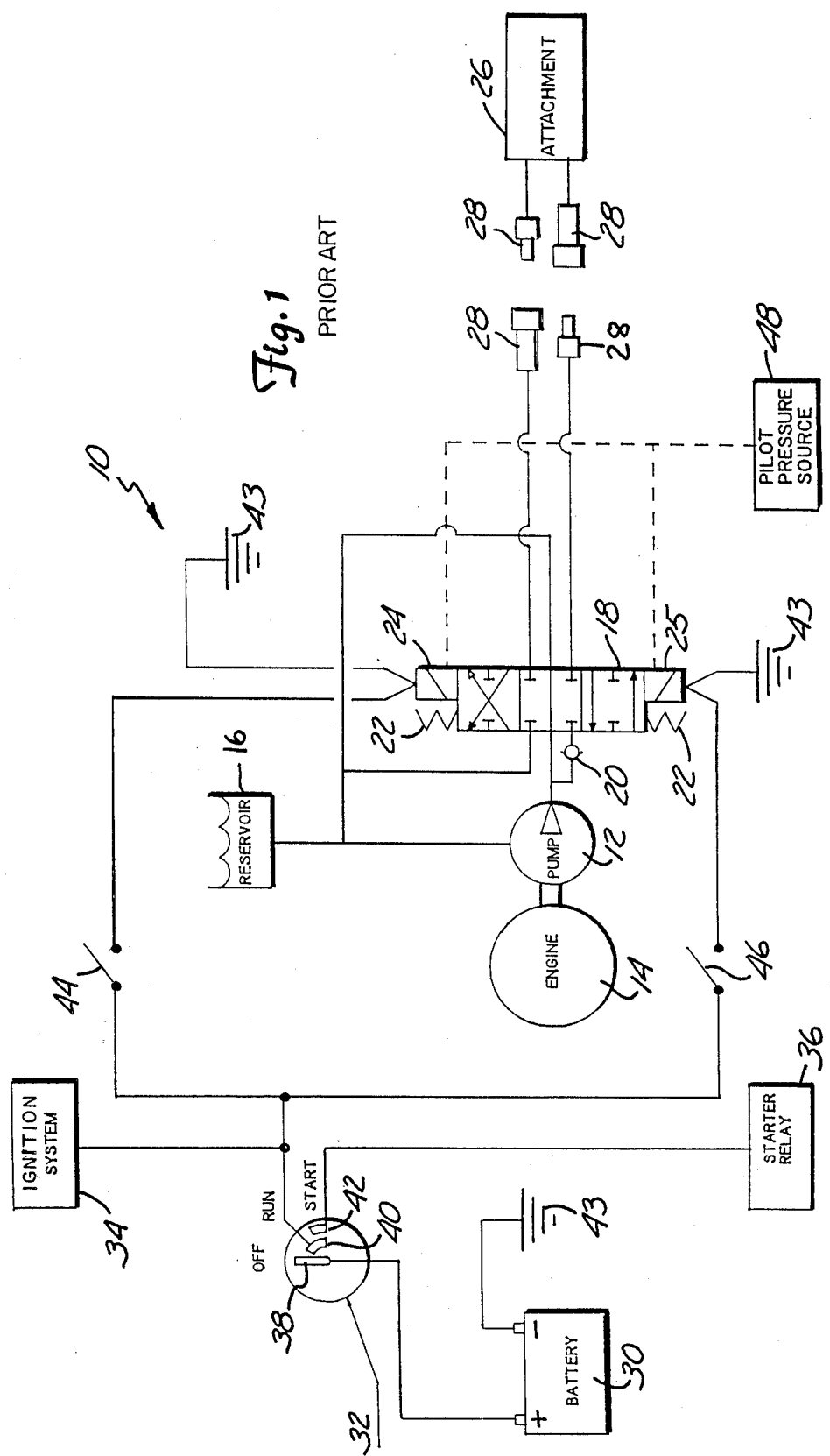
FIG. 1 is a block diagram representation of a known prior art auxiliary hydraulic system for off-road vehicles.

An auxiliary hydraulic system 110 in accordance with the present invention is illustrated generally in FIG. 2. System 110 includes a hydraulic pump 112, engine 114, reservoir 116, and electro-hydraulic spool valve 118. A spool (not separately shown) of valve 118 is biased to a neutral position by springs 122. Solenoid valves 124 and 125 are mounted to opposite sides of valve 118. When energized, solenoid valves 124 and 125 introduce pilot pressure from source 148 which hydraulically strokes the spool against the force of springs 122. Auxiliary hydraulic system 110 is part of a skid steer loader hydraulic system in one embodiment. Remaining portions of the skid steer loader hydraulic system are not shown since they form no part of the present invention.

Several alternative pilot pressure sources 148 are commonly used in skid steer loaders. One design includes a charge pump driven by the engine for providing charging fluid pressure to the hydrostatic system. Another design uses the return flow of fluid from the spool valve as charging fluid. As shown in FIG. 2, pressure in return flow conduit 150 is maintained by relief valve 149, which allows return flow from valve 118 to be used as a source of pilot pressure. These or other systems can be used as pilot pressure source 148. Since the above identified sources 148 require engine pressurized fluid, pilot pressure will not be available after the engine has stopped.

As shown in FIG. 2, pump 112 is coupled directly to the input port of valve 118. It has been found that the use of load check valves such as that shown at 20 in the prior art embodiment described with reference to FIG. 1 is not needed. The load check valve is not needed because the spool is driven through its neutral-to-stroked transition so quickly that attachment drift caused by transitional effects are not present. Work ports of valve 118 are coupled to attachment 126 through matched sets of quick couplers 128. For reasons described below, quick couplers 128 which are not of the connect-underpressure type can be used in auxiliary hydraulic system 110, while still facilitating easy interconnection of attachment 126 to hydraulic system 110.

Electrical components of auxiliary hydraulic system 110 include battery 130, ignition switch 132, ignition system 134, relay starter 136, forward switch 144, and reverse switch 146. Ignition switch 132 has a rotating contact member 138, run contact member 140, start contact member 142, and relief contact member 141. The negative (−) terminal of battery 130 is connected to ground 143, while the positive (+) terminal is connected to contact member 138. Run contact member 140 is interconnected to ignition system 134, to ground 143 through auxiliary forward switch 144 and solenoid valve 124, and to ground 143 through auxiliary reverse switch 146 and solenoid valve 125. Start contact member 142 is connected to starter relay 136. Relief contact member 141 is connected to ground 143 directly through solenoid valve 124. Alternatively, relief contact member 141 could be connected to ground 143 directly through solenoid valve 125.

Engine 114 is started when contact member 138 is rotated to the START position, interconnecting battery 130 with ignition system 134 and starter relay 136. After engine 114 has been started, contact member 138 of ignition switch 132 is rotated to the RUN position.

While ignition switch 132 is in the RUN position, an operator can actuate attachment 126 by closing auxiliary forward switch 144. Solenoid valve 124 is thereby actuated, and will cause pilot pressure from source 148 to be introduced into valve 118. This pilot pressure strokes the valve spool from its neutral position against the force of spring 122. Hydraulic fluid is thereby provided to attachment 126 in a first or forward direction. Switch 144 is opened when it is desired to discontinue the forward direction supply of hydraulic fluid to attachment 126. By opening and closing auxiliary reverse switch 146 in a similar manner, the operator can control the reverse direction flow of hydraulic fluid through atachment 126. As shown schematically in FIG. 2, valve 118 includes transitional spool timing which occurs as the spool is moved from the neutral position to the fully stroked position.

Through the use of ignition switch 132, the operator can energize solenoid valve 124 and relieve trapped fluid pressure between couplers 128 and valve 118. Rotation of contact member 138 from its RUN position to its RELIEF position results in engine 114 being shut down. So long as engine 114 is still rotating, however, some pilot pressure from source 148 will be available. By holding contact member 138 in its RELIEF position while the engine is winding down, solenoid valve 124 will be actuated and introduce available pilot pressure from source 148 into valve 118. The valve spool is then actuated and causes trapped pressure between couplers 128 and valve 118 to approach zero as the valve spool gradually returns to its neutral position with deteriorating pilot pressure resulting from continually decreasing engine RPM. This pressure "bleed-off" is a result of valve spool timing, typical in state-of-the-art spool valves, that allows both valve work ports to communicate with either the power core or the exhaust core of the valve while the spool is in transition from its stroked position to its neutral position. Since the trapped fluid pressure can be released, couplers other than those of the connect-under-pressure type can be used to interconnect attachment 126 to valve 118 after engine 114 is shut down.

Although the present invention has been described with reference to preferred embodiments, workers skilled in the art will recognize that changes may be made in form and detail without departing from the spirit and scope of the invention. In particular, although relief contact member 141 is shown interconnected to solenoid valve 124, the pressure relief function will work just as well if the relief contact member were coupled to solenoid valve 125. Furthermore, the relief switch need not be part of ignition switch 132.

What is claimed is:

1. An auxiliary coupler pressure relief hydraulic system for a mobile vehicle, including:
    a battery;
    an engine;
    an engine ignition system;
    an operator actuated ignition switch having RUN and OFF positions, for controlling the flow of electricity to the engine ignition system;
    a reservoir of hydraulic fluid;
    a pump coupled to the engine and reservoir for providing hydraulic fluid under pressure;
    coupler means for coupling hydraulic fluid to an attachment;
    an electro-hydraulically actuated control valve connected in a hydraulic circuit between the pump and the coupler means, for controlling the flow of hydraulic fluid to the coupler means in response to valve actuating signals;

operator actuated auxiliary control switch means coupled to the control valve for providing attachment control valve actuating signals; and operator actuated pressure relief switch means coupled to the control valve and capable of providing electrical pressure relief valve actuating signals to the control valve after the ignition switch has been switched to its OFF position and while the engine RPM is decreasing to zero, thereby actuating the control valve and relieving pressure between the control valve and coupler means.

2. The hydraulic system of claim 1 wherein the ignition switch has a RELIEF position and further includes means functioning as the pressure relief switch means, wherein the ignition switch provides the pressure relief valve actuating signals when switched to its RELIEF position.

3. The hydraulic system of claim 1 wherein
the system further includes a pilot pressure source; and
the electro-hydraulically actuated control valve is connected to the pressure relief switch means and the pilot pressure source.

4. An auxiliary coupler pressure relief hydraulic system for a mobile vehicle, including:
a battery;
an engine;
an engine ignition system;
a reservoir of hydraulic fluid;
a pump coupled to the engine and reservoir for providing hydraulic fluid under pressure;
coupler means coupling hydraulic fluid to an attachment;
a pilot pressure source;
an electro-hydraulic spool valve coupled to the pilot pressure source and connected in a hydraulic circuit between the pump and the coupler means, for controlling the flow of hydraulic fluid to the coupler means in response to valve actuating signals;
auxiliary control switch means coupled to the spool valve for providing attachment control valve actuating signals; and
an operator actuated ignition switch having RUN, OFF and RELIEF positions for controlling the flow of electricity from the battery to the engine ignition system and the spool valve, wherein the ignition switch provides pressure relief valve actuating signals to the spool valve when the ignition switch has been switched to its RELIEF position and while the engine RPM is decreasing to zero.

5. The pressure relief hydraulic system of claim 4 wherein the RELIEF position of the ignition switch is a position opposite the OFF position from the RUN position.

* * * * *